(12) United States Patent
Kondo et al.

(10) Patent No.: US 10,352,831 B2
(45) Date of Patent: Jul. 16, 2019

(54) METHOD FOR MEASURING WEAR OF RAILROAD VEHICLE WHEEL FLANGE

(71) Applicant: NIPPON STEEL & SUMITOMO METAL CORPORATION, Tokyo (JP)

(72) Inventors: Osamu Kondo, Tokyo (JP); Yoshiyuki Shimokawa, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 15/525,080

(22) PCT Filed: Nov. 10, 2015

(86) PCT No.: PCT/JP2015/081584
§ 371 (c)(1),
(2) Date: May 8, 2017

(87) PCT Pub. No.: WO2016/076307
PCT Pub. Date: May 19, 2016

(65) Prior Publication Data
US 2017/0336293 A1    Nov. 23, 2017

(30) Foreign Application Priority Data
Nov. 11, 2014    (JP) .................... 2014-228863

(51) Int. Cl.
*G01M 17/10*    (2006.01)
*B61K 9/12*    (2006.01)
*G01B 21/02*    (2006.01)

(52) U.S. Cl.
CPC ............. *G01M 17/10* (2013.01); *B61K 9/12* (2013.01); *G01B 21/02* (2013.01)

(58) Field of Classification Search
CPC ....................................... G01M 17/10
See application file for complete search history.

(56) References Cited

U.S. PATENT DOCUMENTS 3,978,712 A * 9/1976 Cowan ................. G01B 17/06
73/597
4,932,784 A   6/1990 Danneskiold-Samsoe
(Continued)

FOREIGN PATENT DOCUMENTS

DE    102013001973 B3 *   1/2014 ............ B61C 15/14
EP       1 600 351            11/2005
(Continued)

*Primary Examiner* — Jamel E Williams
(74) *Attorney, Agent, or Firm* — Clark & Brody

(57) ABSTRACT

An amount of wear of a railroad vehicle wheel flange online while traveling in a curved section is directly measured. A laser rangefinder 3 is installed on an outer track side in a rounded curve section of a railroad track. When a railroad vehicle travels through the rounded curve section, the laser rangefinder 3 measures a distance to a front rim surface of a wheel on an outer track side of a wheelset in a forward direction of travel of a bogie forming a vehicle. The amount of wheel flange wear is obtained by comparing this measured distance with a previous measurement of the measured distance. It is then possible to control the amount of wheel flange wear when traveling in a curved section, thus making it possible to quickly find wheels having flange wear that has exceeded a control range and ensure safety during travel of the railroad vehicle.

3 Claims, 6 Drawing Sheets

(56) References Cited

U.S. PATENT DOCUMENTS

| | | | | | |
|---|---|---|---|---|---|
| 5,368,260 | A | * | 11/1994 | Izbinsky | B61K 9/12 246/169 R |
| 5,636,026 | A | * | 6/1997 | Mian | B61K 9/12 250/224 |
| 6,675,077 | B2 | * | 1/2004 | Dembosky | B61F 5/383 701/19 |
| 2005/0259273 | A1 | * | 11/2005 | Mian | B61K 9/08 356/601 |

FOREIGN PATENT DOCUMENTS

| | | | | |
|---|---|---|---|---|
| EP | 1614602 A1 | * | 1/2006 | B61K 9/08 |
| JP | 07-243845 | | 9/1995 | |
| JP | 07243845 A | * | 9/1995 | |
| JP | 2006-118901 | | 5/2006 | |
| JP | 2006118901 A | * | 5/2006 | |
| JP | 2007-192687 | | 8/2007 | |
| JP | 2007-292473 | | 11/2007 | |
| JP | 2010-151827 | | 7/2010 | |
| JP | 2010-181216 | | 8/2010 | |
| JP | 4657767 | | 3/2011 | |
| JP | 2011-068242 | | 4/2011 | |
| JP | 2011-242239 | | 12/2011 | |
| JP | 2012-145350 | | 8/2012 | |
| JP | 2012145350 A | * | 8/2012 | |
| WO | 92/00214 | | 1/1992 | |

* cited by examiner

[FIG.1]
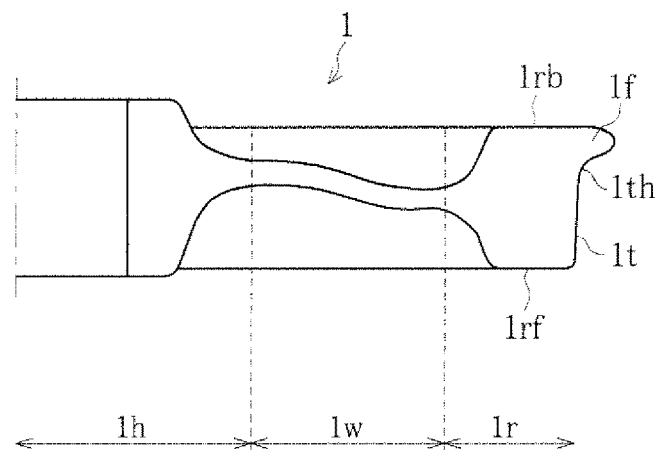
[FIG.2]
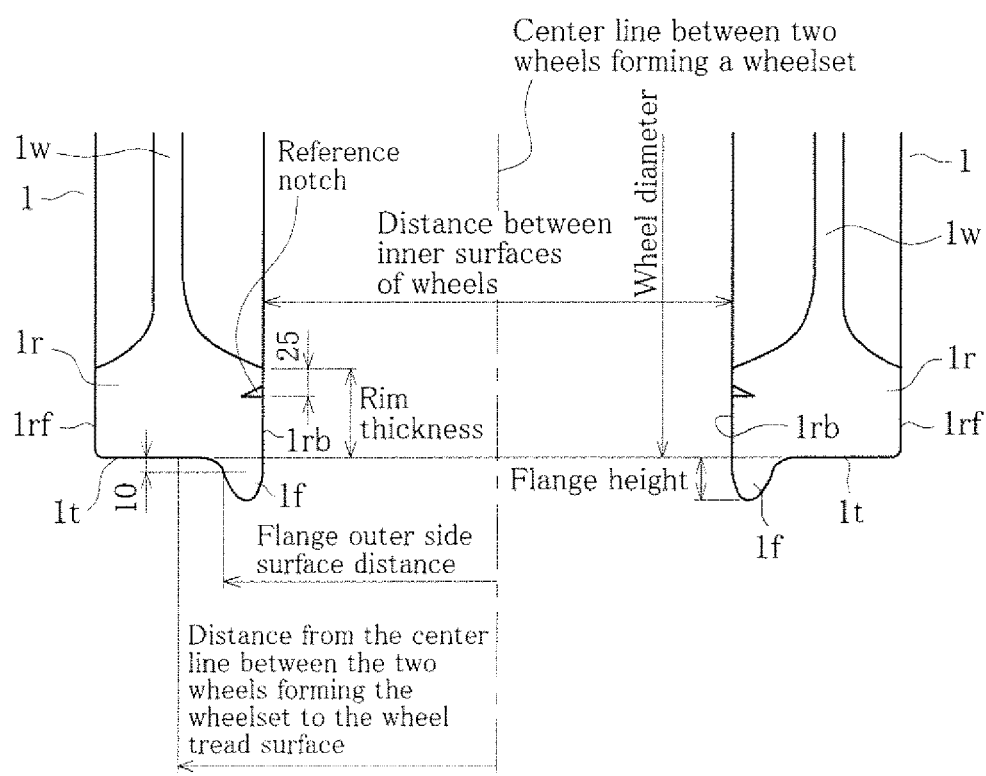

[FIG.3]
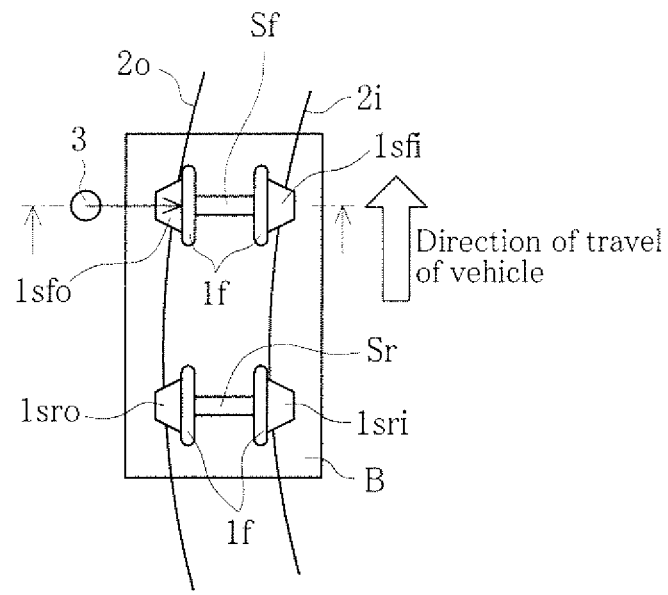
[FIG.4]
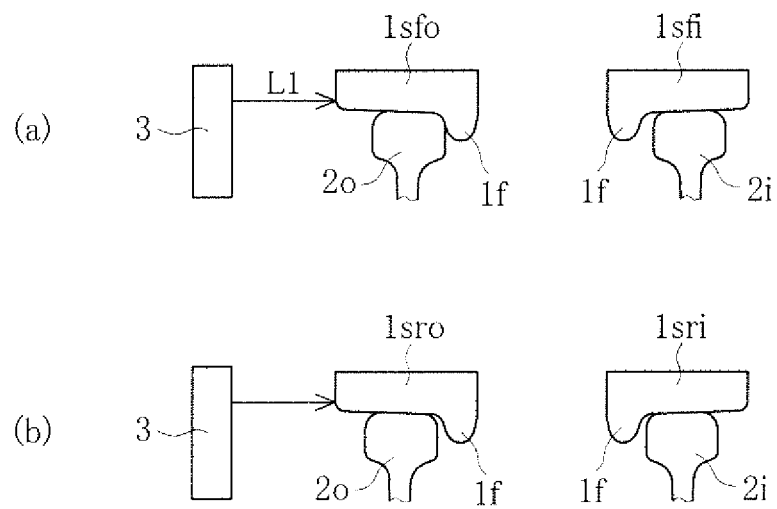

【FIG.5】
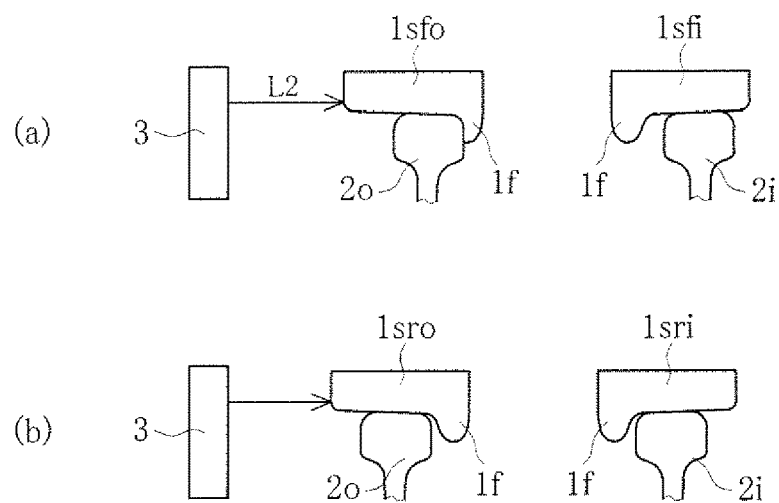
【FIG.6】
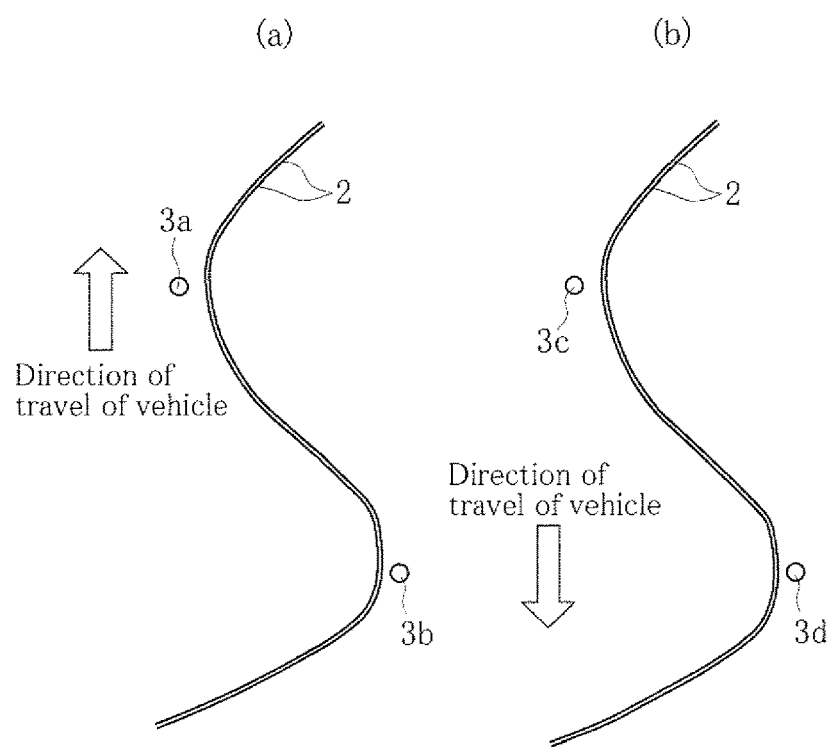

[FIG.7]
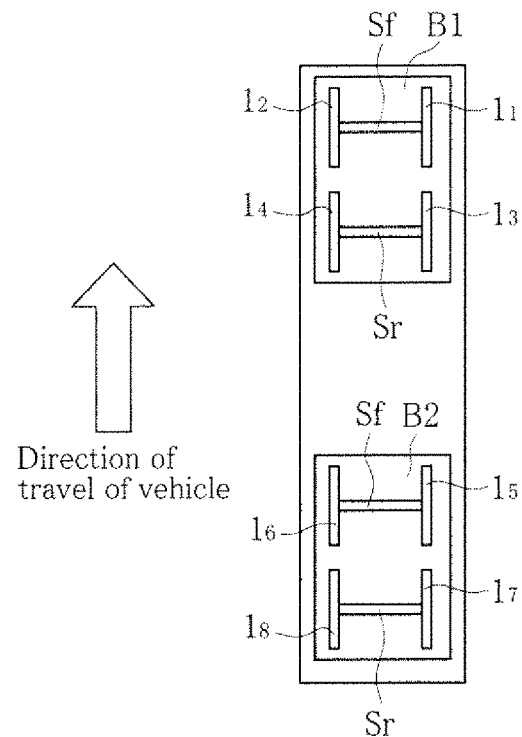
[FIG.8]
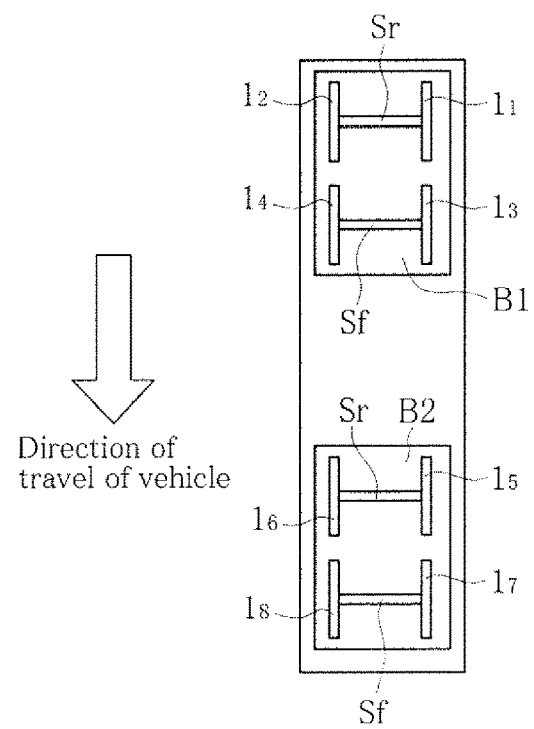

[FIG.9]
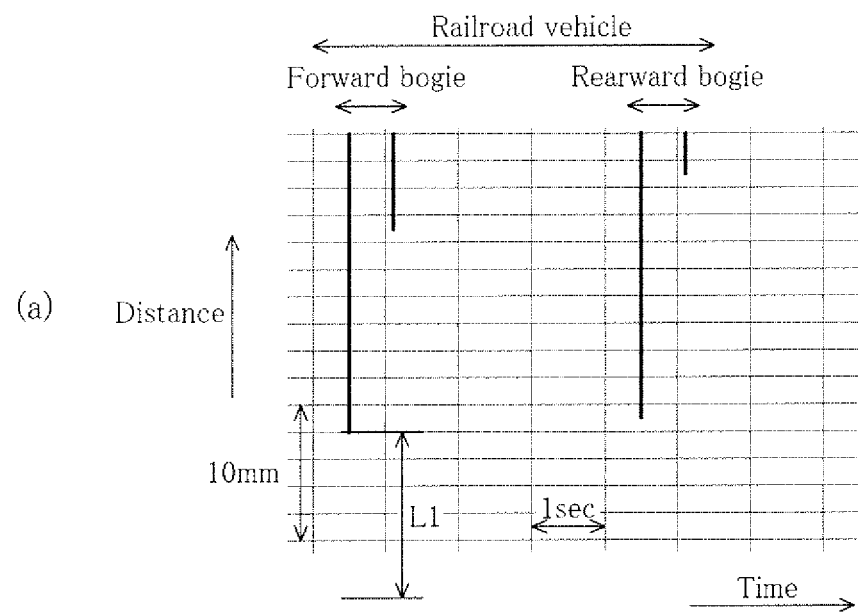
(a)
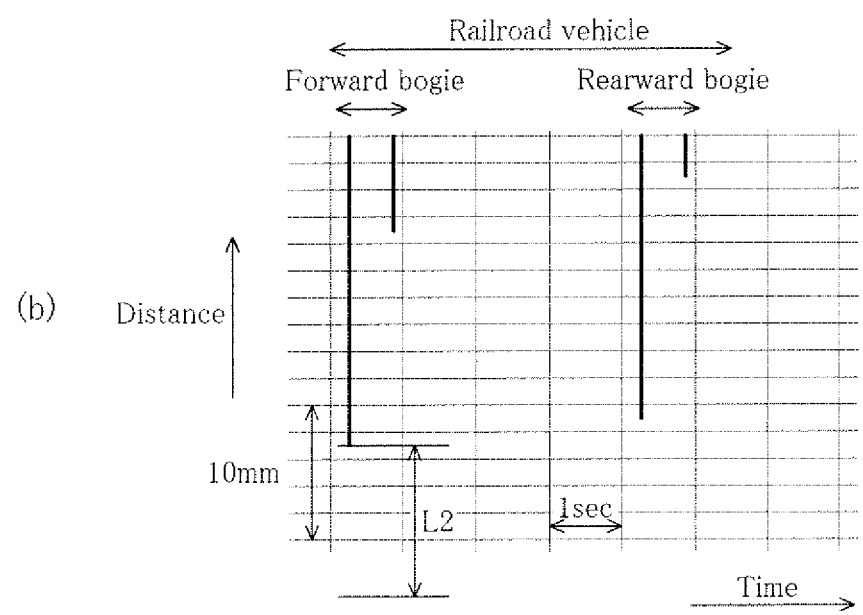
(b)

[FIG.10]
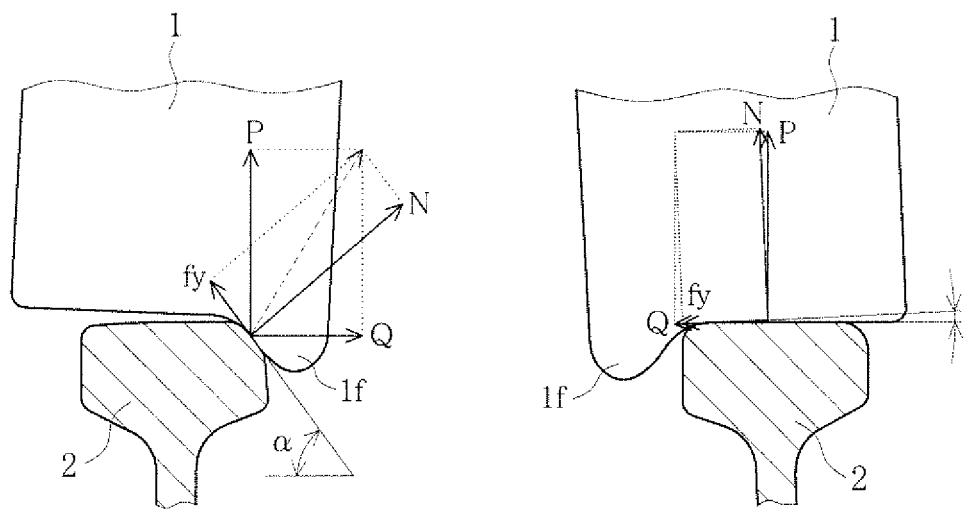
[FIG.11]
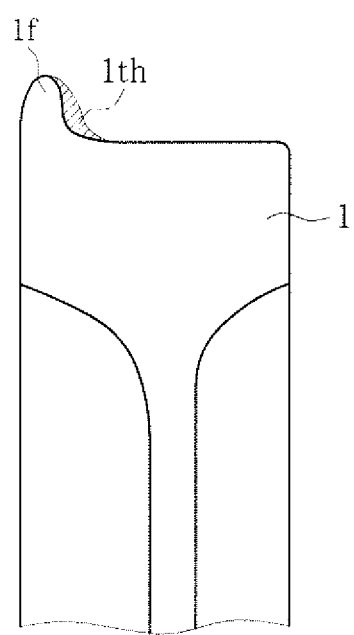

METHOD FOR MEASURING WEAR OF RAILROAD VEHICLE WHEEL FLANGE

TECHNICAL FIELD

The present invention relates to a method for directly measuring an amount of wear of a railroad vehicle wheel flange online during travel.

BACKGROUND ART

A railroad vehicle wheel makes contact with a rail during travel. When the wheel becomes worn due to contact with the rail, it greatly affects the ability of the railroad vehicle to move. It is therefore very important to control the amount of wear of the wheels in order to ensure safe travel of the railroad vehicle.

FIG. 10 schematically illustrates how a wheel 1 receives a force from a rail 2 during travel along a curved section formed from a gentle curve and a rounded curve. On the left-hand side of FIG. 10, the rail 2 is on an outer periphery of the curved section, and on the right-hand side of FIG. 10, the rail 2 is on an inner periphery of the curved section. Below, the outer periphery of the curved section is referred to as an outer track side, and the inner periphery of the curved section is referred to as an inner track side.

A wheel load P which the wheel 1 vertically imposes on a rail surface, and a lateral force Q which the wheel 1 imposes on a side surface of the rail 2 are important control indices for ensuring safe travel in a curved section. In order to maintain the wheel load P and the lateral force Q within an appropriate range, it is necessary to appropriately control an angle (flange angle) $\alpha$ formed between a horizontal line and a tangent at a point of contact between the rail 2 and a flange 1f of the wheel 1 on the outer track side, particularly in a wheelset in a forward direction of travel (hereinafter referred to as a front wheelset) of a bogie. In FIG. 10, N is a normal force and fy is a lateral creep force.

One means for appropriately maintaining the flange angle $\alpha$ of the railroad vehicle wheel, is to rapidly detect a vertical wear generated in the flange 1f of the wheel 1, and to optimize the shape of the wheel 1 by using a rotating tool (referred to below as a milling). The term vertical wear refers to abrasion that occurs when a throat 1th of the wheel 1 becomes worn and the flange 1f becomes almost upright (see the hatched portion of FIG. 11).

A variety of methods for measuring the shape of railroad vehicle wheels have been disclosed. For example, in Patent Reference 1 there is disclosed a device that employs a shape measuring device to measure a wheel tread shape and a rail cross-sectional shape on the right and on the left, and then to convert these shape data to discrete date for each specified interval in the direction of wheel thickness, in order to assess the contact characteristics between the wheels and the rail.

In Patent Reference 2 there is disclosed a device and a method for continuously measuring changes in wheel tread shape throughout the peripheral direction.

In Patent Reference 3 there is disclosed a device for quantitatively estimating changes in wear-induced changes in the flange angle relative to the travel distance, using as a reference the flange angle at the time of design.

In Patent Reference 4 there is disclosed a device and a method for measuring wheel shape by employing a plurality of laser rangefinders. In Patent Reference 5 there is disclosed a method and a device for measuring wheel shape by employing a plurality of cameras and a plurality of laser rangefinders.

In Patent References 6 and 7 there are disclosed devices and methods for installing devices that calculate wheel shape, including wheel diameter, flange thickness, and flange height, by using distance sensors disposed on the outer side and the inner side of the rail to measure the distance to the wheel, and using the resulting measurements together with distance data relating to the position of the two distance sensors.

However, the art disclosed in Patent References 1-3 are not technologies for making measurements while a vehicle is traveling, but rather, they are technologies for making offline measurements. It is therefore difficult to implement these technologies in a timely manner to ensure safety while a vehicle is traveling.

The art disclosed in Patent References 4-7 employs a plurality of cameras and a plurality of laser rangefinders. Consequently, the specifications are complex and maintenance requires a lot of steps. Moreover, the measured values have to be processed separately, making it difficult to implement these technologies in a timely manner to ensure safety while a vehicle is traveling.

PRIOR ART REFERENCES

Patent References

Patent Reference 1: Japanese Patent No. 4657767
Patent Reference 2: Japanese Patent Application Kokai Publication No. 2011-68242
Patent Reference 3: Japanese Patent Application Kokai Publication No. 2010-151827
Patent Reference 4: Japanese Patent Application Kokai Publication No. 2010-181216
Patent Reference 5: Japanese Patent Application Kokai Publication No. 2011-242239
Patent Reference 6: Japanese Patent Application Kokai Publication No. 2007-292473
Patent Reference 7: Japanese Patent Application Kokai Publication No. 2007-192687

SUMMARY OF THE INVENTION

Problems to be Solved by the Invention

One problem that the present invention aims to solve is that in the art disclosed in Patent References 1-3, it is difficult to implement these technologies in a timely manner to ensure safety while a vehicle is traveling, because these technologies assume that measurements are made offline. Another problem is that in the art disclosed in Patent References 4-7, the specifications are complex and maintenance requires a lot of steps, because these technologies employ a plurality of cameras and a plurality of laser rangefinders. Yet another problem is that it is difficult to implement these technologies in a timely manner to ensure safety while a vehicle is traveling, because the measured values have to be processed separately.

Means for Solving the Problems

The object of the present invention is to make it possible to directly measure an amount of wear of a flange of a railroad vehicle wheel online during travel in a curved section, so as to ensure safety in a timely manner during travel.

The method for measuring wear of a railroad vehicle wheel flange according to the present invention comprises:
 installing a laser rangefinder on an outer track side of a rounded curve section in a railroad track;

measuring a distance to a front rim surface of a wheel on the outer track side at a front wheelset of a bogie forming a vehicle, using the laser rangefinder while the vehicle is traveling through the rounded curve section; and determining an amount of wear of the railroad vehicle wheel flange by comparing the measured distance with a previous measurement of the measured distance.

According to the present invention, an amount of flange wear can be determined simply by comparing a distance to a front rim surface of a wheel on an outer track side at a front wheelset of a bogie measured using a laser rangefinder installed on an outer track side of a rounded curve section while the vehicle is traveling through a curved section to a previous measurement of the measured distance.

According to the present invention, the amount of flange wear on a wheel that has not yet been used or a wheel immediately after being milled can be determined by comparing the distance to the front rim surface of the wheel when a railroad vehicle passes through a curved section, the vehicle having mounted on it a wheel that has not yet been used or a wheel immediately after being milled so that the tread or flange will have a normal shape. Hereinafter, a wheel that has not yet been used is referred to as a "new wheel" and a wheel immediately after being milled is referred to as "freshly milled wheel."

Laser rangefinders are installed at four locations where curvatures in a curved section are the inverse of each other. When these laser rangefinders make measurements in accordance with the present invention to determine the distance to a front rim surface of a wheel on the outer track side at front wheelsets of two axle bogie while traveling through the curved section, it is possible to measure the amount of flange wear of all wheels of the two axle bogie.

Advantageous Effects of the Invention

The present invention makes it possible to control the amount of wheel flange wear by directly measuring the amount of wear of wheel flange wear of a railroad vehicle online during travel through a curved section.

Moreover, according to the present invention, because it is possible to quickly find wheels having flange wear that has exceeded a control range, it becomes possible to obtain very advantageous effects in ensuring safety when a railroad vehicle is traveling through a curved section.

BRIEF DESCRIPTION OF THE DRAWINGS

FIG. 1 is a drawing that indicates the principal sites on a railroad vehicle wheel.

FIG. 2 is a drawing illustrating an example of dimensions comprising the control criteria for a railroad vehicle wheel.

FIG. 3 is a planar view illustrating the relative positions of the wheels, the rails, and the laser rangefinders when a two axle bogie of a railroad vehicle passes through a curved section.

FIG. 4 is a drawing illustrating a case of a new wheel or a freshly milled wheel. FIG. 4(a) is a schematic drawing illustrating the wheels, the rails, and the laser rangefinders when a front wheelset has come to be positioned relative to a laser rangefinder. FIG. 4(b) is a drawing illustrating the wheels, the rails, and the laser rangefinders when a wheelset in a rearward direction of travel (hereinafter referred to as a rear wheelset) of a bogie has come to be positioned relative to a laser rangefinder, depicted in a manner analogous to FIG. 4(a).

FIG. 5 is a drawing illustrating a case where a wheel mounted on a railroad vehicle is worn, depicted in a manner analogous to FIG. 4.

FIG. 6 is a drawing illustrating an example of installation positions of laser rangefinders that are employed when implementing the method according to the present invention. FIG. 6(a) shows an inbound line. FIG. 6(b) shows an outbound line.

FIG. 7 is a drawing illustrating wheels for which flange wear is measured with a laser rangefinder installed in the positions shown in FIG. 6(a).

FIG. 8 is a drawing illustrating wheels for which flange wear is measured with a laser rangefinder installed in the positions shown in FIG. 6(b).

FIG. 9(a) is a graph illustrating measurement results for distance to the front rim surface of a wheel using a laser rangefinder for a railroad vehicle equipped with freshly milled wheels. FIG. 9(b) is a graph illustrating measurement results for distance to the front rim surface of a wheel using a laser rangefinder for a railroad vehicle equipped with wheels having a flange wear of 1 mm.

FIG. 10 illustrates how a wheel of a railroad vehicle receives a force from a rail during travel through a curved section. The left-hand side depicts an outer track side and the right-hand side depicts an inner track side.

FIG. 11 is a drawing illustrating a vertical wear generated in a wheel flange of a railroad vehicle.

EMBODIMENT OF THE INVENTION

The object of the present invention, which is to make it possible to directly measure an amount of wear of a flange of a railroad vehicle wheel online during travel through a curved section, so as to ensure safety in a timely manner while a vehicle is traveling, is achieved by comparing distances to a front rim surface of a wheel measured by a laser rangefinder installed on an outer track side of a rounded curve section.

Example

Following is a description of an example of the method for measuring wear of a railroad vehicle wheel flange according to the present invention, making reference to FIG. 1 to FIG. 8.

FIG. 1 is a drawing that indicates the principal sites on a railroad vehicle wheel. A wheel 1 is formed from three parts: a wheel boss 1$h$ into which is inserted an axle; a rim 1$r$ that makes contact with a rail 2; and a plate 1$w$ that connects the boss 1$h$ and the rim 1$r$.

On an outer periphery of the rim 1$r$ are formed a tread 1$t$ that makes contact with the rail 2 and a flange 1$f$ that is continued to the tread 1$t$ via a throat 1$h$. A side surface of the rim 1$r$ on a side where the flange 1$f$ is formed is referred to as a back rim surface 1$rb$, and a side surface on a side opposite to the back rim 1$rb$ is referred to as a front rim surface 1$rf$.

In general, when a railroad vehicle is traveling through a curved section with a radius of curvature of 800 m or less, as described above, the throat 1$th$ of the wheel 1 on the outer track side at a front wheelset Sf of a bogie B in particular is pressed against the rail 2. Consequently, as the travel time of the railroad vehicle increases, the vertical wear of the flange 1$f$ of the wheel 1 increases, and the distance between the outer surfaces of the flanges of the two wheels 1 forming the wheelset decreases (see FIG. 2). This is referred to below as a "flange outer side surface distance."

In addition, because the throat $1th$ of the wheel 1 on the outer track side at a front wheelset Sf is pressed against the rail 2 while traveling through a curved section, the front wheelset Sf moves to the outer track side only by the amount at which the flange outer surface distance of the wheel 1 decreases.

Therefore, as shown in FIG. 3, the amount of wear of the flange $1f$ of the wheel 1 can be determined by installing a laser rangefinder 3 on an outer side of a rail $2o$ on an outer track side in a rounded curved section, and then measuring the distance from this installation position to the front rim surface $1rf$ of a wheel $1sfo$ on an outer track side of the front wheelset Sf while the railroad vehicle is traveling.

For example, first, a railroad vehicle equipped with new wheels or freshly milled wheels 1 is caused to travel, and then, when the vehicle is traveling through a curved section, a distance L1 to the front rim surface $1rf$ of the wheel $1sfo$ on the outer track side of the front wheelset Sf is measured using the laser rangefinder 3 (see FIG. 4(*a*)).

The measurement of the distance L1 is used to reset a lateral displacement of the front wheelset Sf to zero. This assures accuracy of measurements made using the laser rangefinder 3 when a railroad vehicle equipped with the wheel $1sfo$ having a worn flange $1f$ passes through a curved section.

After that, a length L2 to the front rim surface $1rf$ of the wheel $1sfo$ of the railroad vehicle is measured using the laser rangefinder 3 when the vehicle is passing through a curved section and one wants to measure the amount of wear of the flange $1f$ of the wheel $1sfo$ (see FIG. 5(*a*)).

In FIG. 3 to FIG. 5, a rail on an inner track side is indicated by the reference symbol $2i$. In addition, a wheel on an inner track side of the front wheelset Sf is indicated by the reference symbol $1sfi$, a wheel on an outer track side of a rear wheelset Sr is indicated by the reference symbol $1sro$, and a wheel on an inner track side of the rear wheelset Sr is indicated by the reference symbol $1sri$.

The amount of wear of the flange $1f$ of the wheel $1sfo$ can be determined by subtracting the measured distance L2 from the measured distance L1.

The amount of wheel flange wear is defined as the amount of change in (flange outer side surface distance-wheel inner surface distance)/2 (see FIG. 2) with respect to the new wheels or the freshly milled wheels. As the wheel wear progresses, the amount of change in (flange outer side surface distance-wheel inner surface distance)/2 decreases. The wheel inner surface distance is defined as the distance between the inner surface of the two wheels 1 forming a wheelset.

When such a calculation is made, it becomes possible to perform an assessment of the amount of wear over time, as long as the vehicle equipped with new wheels or freshly milled wheels is kept track of, by sequentially measuring the amount of wheel flange wear on the outer track side of the front wheelset when passing through the laser rangefinders.

According to the present invention, laser rangefinders $3a$-$3d$ may be installed at two respective sites where the curvature of the rail 2 is inverted in each of the respective inbound and outbound lines, in order to measure the amount of flange wear on all of the wheels of the bogie B, i.e., the wheels $1sfo$ and $1sfi$ of the front wheelset Sf, and the wheels $1sro$ and $1sri$ of the rear wheelset Sr (see FIG. 6).

When the laser rangefinders $3a$-$3d$ are installed in such positions, it becomes possible to measure the amount of wear of the flange $1f$ of the wheel $1sfo$, if measurements are made of the distances L1 and L2 to the front rim surface $1rf$ of the wheel $1sfo$ on the outer track side of the front wheelset Sf, for the two axle bogie B1 positioned on the front side with respect to the direction of travel of the vehicle, and the two axle bogie B2 positioned on the rear side, respectively. In other words, it becomes possible to measure the amount of flange wear for all wheels mounted in a single railroad vehicle.

In further detail, in the case of an inbound line shown in FIG. 7, it is possible to measure the amount of wear of the flange if of wheels $1_2$ and $1_6$ on the outer track side of the front wheelset Sf of the two axle bogie B1 positioned on the front side and the front wheelset Sf of the two axle bogie B2 positioned on the rear side, by using the laser rangefinder $3a$. In addition, it is possible to measure the amount of wear of the flange $1f$ of wheels $1_1$ and $1_5$ on the outer track side of the front wheelset Sf of the two axle bogie B1 positioned on the front side and the front wheelset Sf of the two axle bogie B2 positioned on the rear side, by using the laser rangefinder $3b$.

On the other hand, in the case of an outbound line shown in FIG. 8, it is possible to measure the amount of wear of the flange if of wheels $1_8$ and $1_4$ on the outer track side of the front wheelset Sf of the two axle bogie B2 positioned on the front side and the front wheelset Sf of the two axle bogie B1 positioned on the rear side, by using the laser rangefinder $3c$. In addition, it is possible to measure the amount of wear of the flange $1f$ of wheels $1_7$ and $1_3$ on the outer track side of the front wheelset Sf of the two axle bogie B2 positioned on the front side and the front wheelset Sf of the two axle bogie B1 positioned on the rear side, by using the laser rangefinder $3d$.

The inventors employed laser rangefinders installed on the outer track side of a rounded curve section of an experimental track to determine the distance to the front rim surface of a wheel mounted on a vehicle traveling at a speed of 10 km/h through a curved section of the experimental track having a rounded curve with a radius of curvature of 120 m. The measurement results are described below.

FIG. 9(*a*) is a graph illustrating measurement results for distance to the front rim surface of a wheel of a railroad vehicle equipped with freshly milled wheels. FIG. 9(*b*) is a graph illustrating measurement results in a manner similar to FIG. 9(*a*), in the case of a railroad vehicle equipped with wheels having a flange wear of 1 mm.

In the case of wheels on the outer track side at the front wheelset of a forward bogie, the measured distance to the front rim surface was found to be 1 mm shorter when the amount of wheel flange wear was 1 mm (see FIG. 9(*b*)) than in the case of freshly milled wheels (see FIG. 9(*a*)), thereby confirming the advantageous effects of the present invention.

The present invention is not limited to the above-described example, and the preferred embodiment may, of course, be advantageously modified within the scope of the technical ideas recited in the claims.

For example, in the above-described example according to the present invention, measurements of distance to the front rim surface $1rf$ of the wheel $1sfo$ on the outer track side of the front wheelset Sf are performed using laser rangefinders 3 installed on the outer side of the rail $2o$ on the outer track side in a rounded curve section. However, measurements of the distance to the back rim surface $1rb$ may also be performed using laser rangefinders 3 installed on the inner side of the rail $2o$ on the outer track side.

If measurements only of flange wear amounts for specified wheels are to be taken, then there is no need to install laser rangefinders 3 at four sites as shown in FIG. 6, but rather at one site.

EXPLANATION OF THE REFERENCE SYMBOLS

1 Wheel
1sfo Wheel on the outer track side of the front wheelset
1f Flange
1rf Front rim surface
2 Rail
3 Laser rangefinder
B Bogie
Sf Front wheelset

The invention claimed is:

1. A method for measuring wear of a railroad vehicle wheel flange comprising:
   installing a laser rangefinder on an outer track side of a rounded curve section in a railroad track;
   measuring a distance to a front rim surface of a wheel on the outer track side at a wheelset in a forward direction of travel of a bogie forming a vehicle, using the laser rangefinder while the vehicle is traveling through the rounded curve section; and
   determining an amount of wear of the railroad vehicle wheel flange in comparison to a previous measurement of the measured distance by subtracting the measured distance from the previous measurement of the measured distance.

2. A method for measuring wear of a railroad vehicle wheel flange comprising:
   installing a laser rangefinder on an outer track side of a rounded curve section in a railroad track;
   using the laser rangefinder to measure in advance a distance to a front rim surface of a wheel on an outer track side at a wheelset in a forward direction of travel of a bogie forming the vehicle when the railroad vehicle passes through the rounded curve section, the vehicle having mounted on it a wheel that has not yet been used or a wheel immediately after being milled so that the tread or flange will have a normal shape; and
   using the laser rangefinder to measure a distance to a front rim surface of a vehicle of a wheel on an outer track side at a wheelset in a forward direction of travel of a bogie forming the vehicle when the railroad vehicle passes through the rounded curve section, and then subtracting that distance from the measured distance to the front rim surface of a wheel that has not yet been used or a wheel immediately after being milled, so as to obtain the amount of flange wear of a wheel that has not yet been used or a wheel immediately after being milled.

3. The method for measuring wear of a railroad vehicle wheel flange according to claim 1, wherein laser rangefinders are installed in four locations where curvatures in the rounded curve section are the inverse of each other, and these laser rangefinders are used to measure the distance to the front rim surface of a wheel on the outer track side at a wheelset in a forward direction of travel in a two axle bogie while traveling through the rounded curve section.

* * * * *